LE GRAND KNIFFEN.
POTATO HARVESTER.
APPLICATION FILED JUNE 29, 1908.

922,915.

Patented May 25, 1909.
2 SHEETS—SHEET 1.

Witnesses:
Chas. E. Gorton.
M. A. Nyman.

Inventor:
Le Grand Kniffen.
By Chas. C. Tillman
Atty.

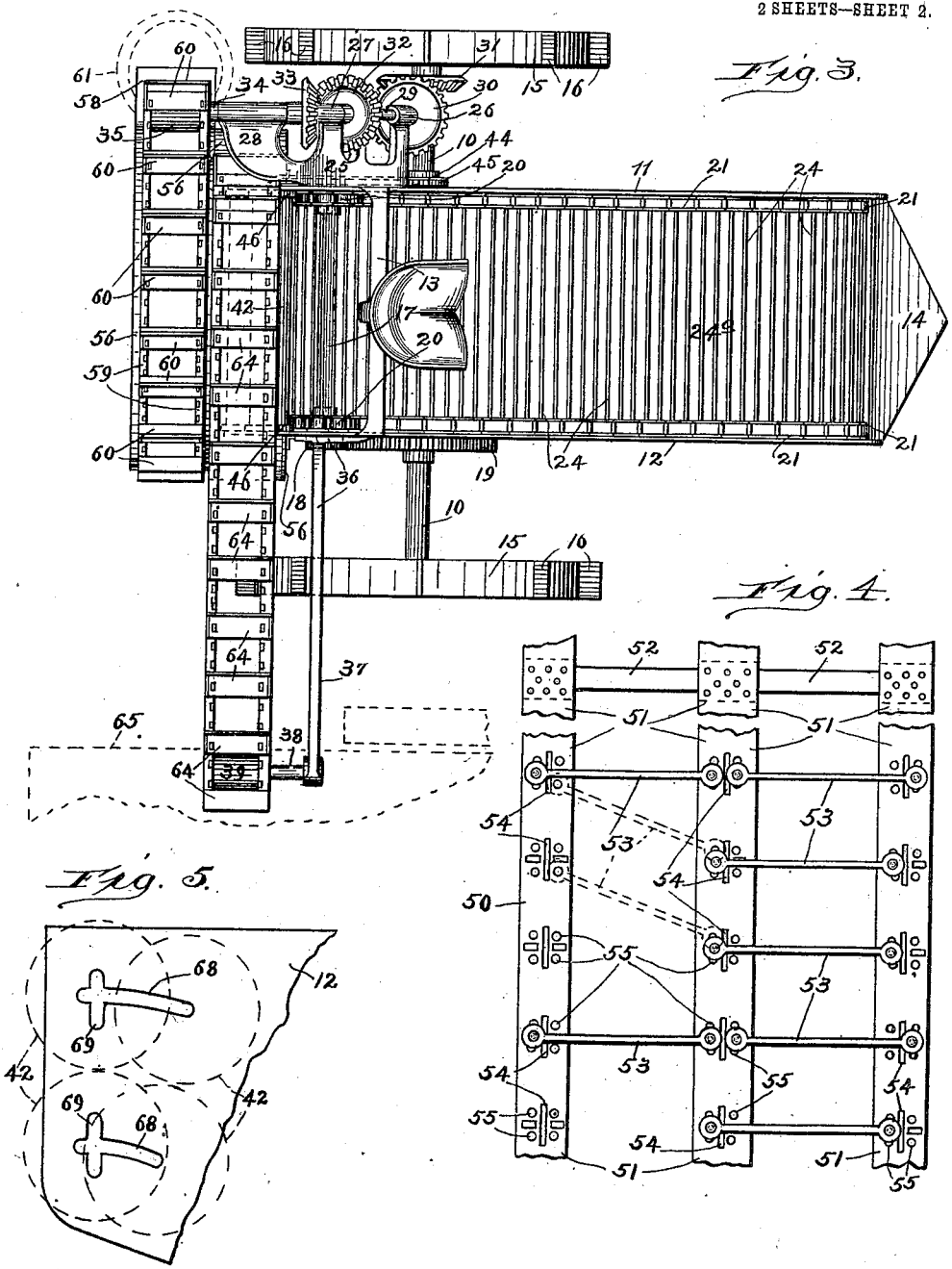

UNITED STATES PATENT OFFICE.

LE GRAND KNIFFEN, OF CHICAGO, ILLINOIS.

POTATO-HARVESTER.

No. 922,915.  Specification of Letters Patent.  Patented May 25, 1909.

Application filed June 29, 1908. Serial No. 441,002.

*To all whom it may concern:*

Be it known that I, LE GRAND KNIFFEN, a citizen of the United States, residing at Chicago, in the county of Cook and State of Illinois, have invented certain new and useful Improvements in Potato - Harvesters, of which the following is a specification.

This invention relates to that class of machines known as potato harvesters, and has especial relation to that type of such harvesters in which an elevator is employed to convey the potatoes, after being moved from the hills or ground, rearwardly and upwardly and for separating them from dirt; and it consists in certain pecularities of the construction, novel arrangements, and operation of the various parts thereof, as will be hereinafter more fully set forth and specifically claimed.

The principal object of the invention is to provide means or attachments which may be connected to elevator potato harvesters of the ordinary or any preferred construction for removing the tops or vines from the potatoes, for separating the larger from the smaller ones and delivering them to opposite sides of the machine, and when desired, loading them into suitable receptacles, such as a wagon or sacks.

Various other objects and advantages of the invention will be disclosed in the subjoined description and explanation.

In order to enable others skilled in the art to which my invention pertains, to make and use the same, I will now proceed to describe it, referring to the accompanying drawings, which serve to illustrate the invention, and in which—

Figure 1:
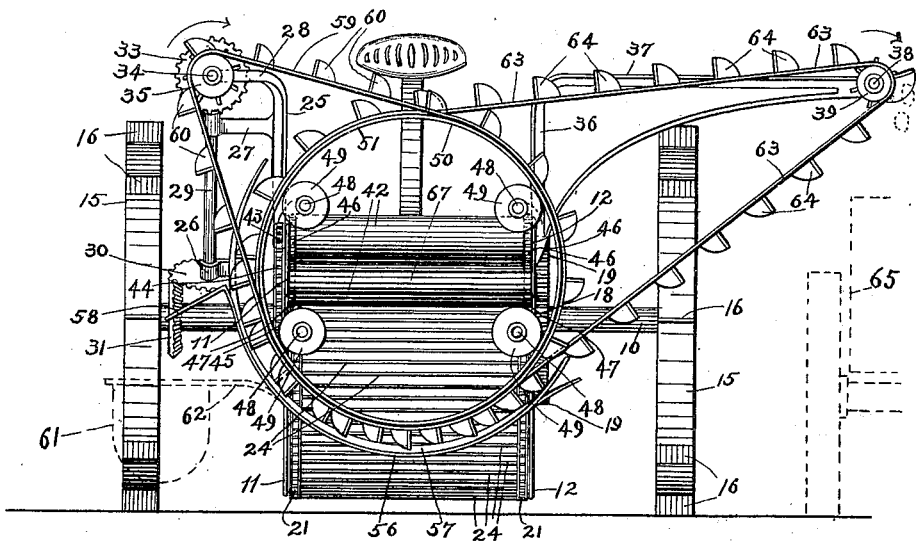
Figure 2:
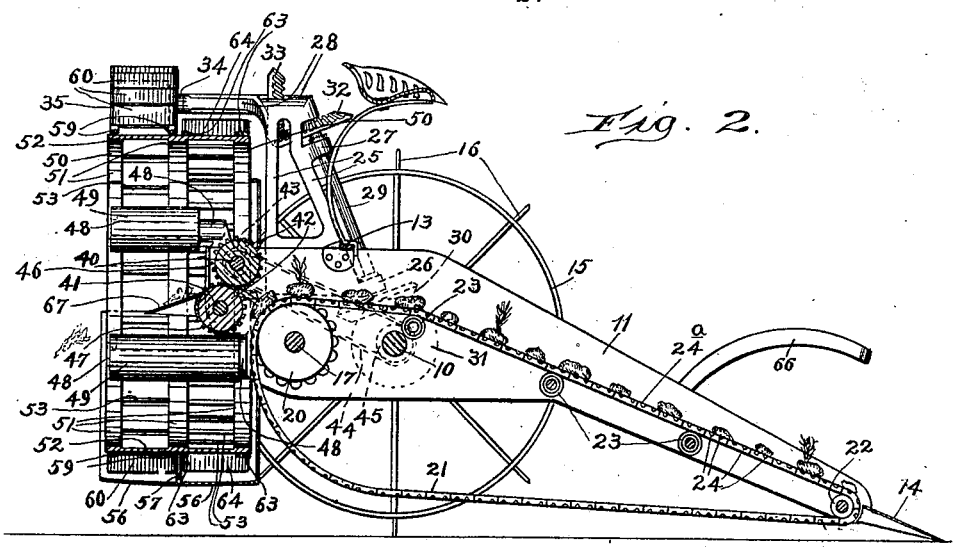

Figure 1 is a rear end view of a potato harvester embodying the invention; Fig. 2 is a central vertical sectional view taken longitudinally through the machine; Fig. 3 is a plan view; Fig. 4 is a greatly enlarged view of a part of the separating drum; —and— Fig. 5 is a detail view in side elevation of a portion of the main frame, showing means for adjusting the vine or tops removing rollers.

Like numerals of reference, refer to corresponding parts throughout the different views of the drawings.

The main frame which is mounted at its rear portion on an axle or driving-shaft 10 consists of two sides 11 and 12 which are spaced apart in parallelism yet connected together at their rear upper portions by means of a cross-bar 13 and at their front ends by means of a shovel 14, which in the present instance is shown as being triangular in shape, but which may be of any other suitable form, and is adapted, in the operation of the machine, to plow or remove the potatoes from the hills or ground. Mounted on each end of the axle or shaft 10 is a wheel 15 which may be of any well-known type, but which wheels are shown as having on their tires a series of spaced apart lugs 16 to engage the ground and to facilitate the operation of the machine. Transversely journaled on the rear portions of the sides 11 and 12 of the main frame is a shaft 17 which projects at one of its ends through one of the sides of the main frame, usually the side indicated by the reference numeral 12, and has mounted on said end a gear 18 which meshes with another gear 19 mounted on the shaft 10 near one side of the main frame.

Near each end of the shaft 17 and near the inner surface of each of the sides of the frame is mounted a sprocket wheel 20 over each of which is passed a sprocket chain 21, which chains are in the form of endless belts, and also pass over an idler 22 transversely journaled on the lower or front ends of the sides 11 and 12 just at the rear of the shovel or point 14, as will be readily understood by reference to Fig. 2 of the drawings. Each of the sides 11 and 12 is provided on its inner surface with a series of idlers 23 on which the chains or belts 21 will rest. These chains or belts are connected transversely by means of a series of spaced apart rods or bars 24 which will serve to support the potatoes, yet will permit the dirt to pass therebetween. Secured to one side of the main frame, usually 11, at its rear portion, is a vertical bracket 25 which has a number of laterally and outwardly extending arms 26, 27 and 28 (see Figs. 1, 2 and 3 of the drawings). Journaled on the arms 26 and 27 is a shaft 29 which has mounted on its lower end a bevel-gear 30 which meshes with a similar gear 31 mounted on the driving-shaft or axle 10 near one of the wheels 15 thereon. Mounted on the upper end of the shaft 29 is another bevel-gear 32 which meshes with a similar gear 33 mounted on one end of a shaft 34 which is horizontally and longitudinally journaled with respect to the main frame on the arm 28 of the supporting bracket 25, and has on its rear portion a sprocket wheel 35 to coact with an endless belt used for rotating the separating drum and also for delivering potatoes to one side of the machine, as will be presently explained. Secured to the rear portion of the side 12 of the main frame is an upright standard or bracket 36 which has a laterally and outwardly extending arm 37 which projects over and some distance beyond the outer surface of the wheel 15 on that side of the machine. Horizontally journaled near the free end of the arm 37 and extending rearwardly is a shaft 38 on which is mounted a sprocket wheel 39 or idler. Horizontally and transversely journaled on the rear portion of the sides of the main frame one above the other are two shafts 40 and 41, the ends of each of which may project through said sides and each has mounted thereon a roller 42 which rollers are located at a sufficient distance from the rear portion of the elevator or that part thereof which passes over the sprocket wheels 20 to permit of the passage of potatoes between said rollers and said part of the elevator, which is designated as a whole by the reference numeral 24ª and consists of the belts 21 and transverse connecting rods 24, as before stated.

Mounted on one end of the shaft 40 is a sprocket wheel 43 over which is passed a sprocket chain 44 which also passes around a sprocket wheel 45 mounted on the driving-shaft or axle 10 near the side 11 of the main frame. On the end of the shafts 40 and 41 opposite that on which the sprocket wheel 43 is located are mounted gears 46 and 47 which mesh with one another so that they will be simultaneously driven by the rotary movement of the shaft 10 and through the instrumentality of the gearing therewith. The rear end of each of the sides 11 and 12 of the main frame is provided with two rearwardly extending stub or floating shafts 48 located one above the other and suitably supported at their front ends on the sides of the frame. Mounted on each of the shafts 48 is a roller, 49 which rollers are for the purpose of rotatably supporting the separating drum, which is indicated as a whole by the reference numeral 50, and which consists of a series of bands 51 (see Fig. 4) which are united together at suitable distances apart by means of cross-bars 52 and also by means of a series of rods 53 secured thereto. Each of the bands 51 forming a part of the drum is provided with a series of slots 54 and openings 55 to permit of the rods 53 being adjusted thereon, for it will be understood that each of the rods 53 has an opening in each of its ends through which, as well as through the slots and openings 55, bolts may be passed in order to secure said rods at desired distances apart or in different positions. The bands 51 of the drum, when the latter is in position on the machine, will impinge against the rollers 49 which act as supports therefor.

Secured transversely on the rear portion of the main frame and depending below the same, as well as beneath the drum 50, is a curved shield 56 which preferably has its rear end open, as shown in Fig. 2 of the drawings. This shield is provided in its lower portion with a partition 57 which extends circumferentially therewith, and said shield has near one of its ends a laterally deflected portion 58 to deflect potatoes to one side of the machine. Extended around the rear outer portion of the drum 50 and around the sprocket wheel 35 is an endless belt 59 of any suitable material, but preferably of the link-belt type, which carries a series of buckets or cups 60 which, in the operation of the machine, will pass between the lower portion of the drum 50 and the lower portion of the shield 56 so as to gather up the larger potatoes which will have been deposited in said space, and deliver them onto the deflector 58 from whence they may pass to the ground at the rear and one side of the machine, or may fall into a bag 61 which may be supported on an arm 62 secured to and extended from the shield 56 or main frame. Extended around the front outer portion of the drum 50 is another endless belt 63 which may be of any well-known type, and also passes over the idler or sprocket wheel 39 journaled on the end of the bracket 37 on the opposite side of the machine from that on which the sprocket wheel 35 is mounted. The endless belt 63 is also equipped with a series of cups or buckets 64 which, in the operation of the machine, will pass between the lower portion of the drum 50 and the lower part of the shield 56 and gather up the smaller potatoes and deliver them to one side of the machine and, when desired, into a wagon 65 which may be drawn alongside the machine by any suitable means. The harvester may be propelled by any suitable power, but usually by means of horses, and the main frame may be connected at its front lower portion by means of forwardly extending arms or brackets 66 to a front truck (not shown) of the ordinary or any well-known construction.

From the foregoing and by reference to the drawings it will be readily understood and clearly seen that, by the forward movement of the machine the shovel 14 will plow under the potatoes and cause them to pass therefrom to the elevator 24ª which will be caused to travel rearwardly over the sprocket wheels 20 by reason of the rotation of the shaft or axle 10 and by reason of the gears 18 and 19 which mesh with one another, as above explained. As the potatoes pass rearwardly from the elevator 24ª, it is apparent that their tops or vines will be drawn between the rollers 42 which are rotated by means of the shaft 10, sprocket wheels 43 and 45, and chain 44, and be thereby removed from the potatoes and thus permit the latter to fall into the drum while the tops or vines will pass onto the shelf 67 at the rear of the rollers 42 and from thence out through the rear end of the drum, which will be rotated through the medium of the gear 31 on the shaft 10, the gears 30 and 32 on the shaft 29, the gear 33 and sprocket wheel 35 on the shaft 34, and the endless belt 59 which passes around said sprocket wheel and drum. In the rotation of the drum it is evident that the cups or buckets 60 on the belt 59 and the cups 64 on the endless belt 63 will scoop up the potatoes from the lower portion of the shield or trough 56 and deliver them to opposite sides of the machine and, when desired, into suitable receptacles therefor, the smaller potatoes being delivered to one side and the larger ones to the other.

In order that the tops of vine removing rollers 42 may be suitably adjusted, each of the sides of the main frame is provided with rearwardly extending slots 68 and vertical openings 69 for the journals of said rollers so that they may be moved toward or from the rear portion of the elevator 24ª, as will be apparent by reference to Fig. 5 of the drawings. It is manifest that the rods 53 which form parts of the drum may be adjusted obliquely, as shown by dotted lines in Fig. 4, or may be adjusted at suitable distances apart in parallelism with one another by means of the slots 54, openings 55, and bolts which are passed through the ends of said rods and through said slots and openings.

Having thus fully described my invention what I claim as new, and desire to secure by Letters-Patent, is—

1. The combination with a wheeled main frame, of a shovel at its front end, an upwardly and rearwardly movable elevator mounted on the frame, a pair of rollers transversely journaled on the rear portion of the frame, a foraminous drum rotatably mounted on the rear portion of the frame and longitudinally with respect thereto and circumscribing said rollers, an endless and bucketed belt extended around said drum, a shield supported on the main frame and located at a distance below the lower portion of the drum, and means to operate the elevator, to rotate said rollers and to operate said belt by the forward movement of the machine.

2. The combination with a wheeled main frame, of an upwardly and rearwardly movable elevator mounted on the frame, a foraminous drum rotatably mounted on the rear portion of the frame and longitudinally with respect thereto, an endless and bucketed belt extended around said drum, a shield supported on the main frame and located at a distance below the lower portion of the drum, and means to operate the elevator, said belt and the drum by the forward movement of the machine.

3. The combination with a wheeled main frame, of an upwardly and rearwardly movable elevator mounted on the frame, a foraminous drum rotatably mounted on the rear portion of the frame and longitudinally with respect thereto, a pair of endless and bucketed belts extended around said drum, one of said belts being disposed at its upper end at one side of the machine and the other of said belts being disposed at its upper end at the other side of the machine, a shield supported on the main frame and located at a distance below the lower portion of the drum, and means to rotate the elevator and one of said belts and through the same to rotate the drum and operate the other belt by the forward movement of the machine.

4. The combination with a wheeled main frame, of an upwardly and rearwardly movable elevator mounted on the frame, a pair of rollers transversely journaled on the rear portion of the frame, a drum rotatably mounted on the rear portion of the frame and longitudinally with respect thereto and circumscribing said rollers, a pair of endless and bucketed belts extended around said drum and disposed to discharge the contents of the buckets on opposite sides of the machine, a shield supported on the main frame and located at a distance below the lower portion of the drum, and means to operate the elevator, to rotate said rollers and to operate one of said belts by the forward movement of the machine whereby the drum will be rotated and the other belt operated.

5. The combination with a wheeled main frame, of an upwardly and rearwardly movable elevator mounted on the frame, a pair of rollers transversely journaled on the rear portion of the frame, a pair of rearwardly extending rollers longitudinally journaled one above the other on each side of the main frame, a drum mounted on the rearwardly extending rollers and longitudinally with respect to the main frame, an endless and bucketed belt extended around said drum, a shield supported on the main frame and extended at a distance below the lower portion of the drum, and means to operate the elevator, to rotate said transverse rollers to operate said belt by the forward movement of the machine.

6. The combination with a wheeled main frame, of an upwardly and rearwardly movable elevator mounted on the frame, a pair of rollers transversely journaled on the rear portion of the frame, a pair of rearwardly extending rollers longitudinally journaled one above the other on each side of the main frame, a drum mounted on the rearwardly extending rollers and longitudinally with respect to the main frame, a pair of endless and bucketed belts extended around said drum and adapted to discharge the contents of their buckets on opposite sides of the machine, a shield supported on the main frame and extended at a distance below the lower portion of the drum, and means to operate the elevator, to rotate the transverse rollers and to operate one of said belts by the forward movement of the machine whereby the drum will be rotated and the other belt operated.

LE GRAND KNIFFEN.

Witnesses:
 MARK CONNOR,
 CHAS. C. TILLMAN.